United States Patent
Ashikawa et al.

(10) Patent No.: US 11,581,786 B2
(45) Date of Patent: Feb. 14, 2023

(54) ROTARY ELECTRIC MACHINE

(71) Applicant: Mitsubishi Electric Corporation, Tokyo (JP)

(72) Inventors: Ryota Ashikawa, Tokyo (JP); Mitsunori Ishizaki, Tokyo (JP); Tomoaki Murata, Tokyo (JP); Takashi Hashiba, Tokyo (JP); Yoshinobu Utsumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 101 days.

(21) Appl. No.: 17/186,113

(22) Filed: Feb. 26, 2021

(65) Prior Publication Data
US 2022/0077744 A1    Mar. 10, 2022

(30) Foreign Application Priority Data

Sep. 8, 2020 (JP) .............................. JP2020-150346

(51) Int. Cl.
*H02K 9/22* (2006.01)
*H02K 5/20* (2006.01)
(Continued)

(52) U.S. Cl.
CPC ............. *H02K 9/227* (2021.01); *H02K 1/243* (2013.01); *H02K 5/203* (2021.01); *H02K 7/083* (2013.01);
(Continued)

(58) Field of Classification Search
CPC ........ H02K 9/227; H02K 7/083; H02K 11/33; H02K 11/30; H02K 1/243; H02K 5/203;
(Continued)

(56) References Cited

U.S. PATENT DOCUMENTS

2014/0232217 A1* 8/2014 Miyama ................. H02K 5/203
                                                                310/68 D
2014/0265670 A1* 9/2014 Chamberlin ........... H02K 11/33
                                                                310/58
(Continued)

FOREIGN PATENT DOCUMENTS

JP      2017085692 A  *  5/2017
JP      2018-207664 A    12/2018

OTHER PUBLICATIONS

Fujita et al, Inverter Integrated Rotating Electric Machine, May 18, 2017, JP 2017085692 (English Machine Translation) (Year: 2017).*

*Primary Examiner* — Alexander A Singh
(74) *Attorney, Agent, or Firm* — Sughrue Mion, PLLC; Richard C. Turner

(57) ABSTRACT

The rotary electric machine includes a motor unit, and an inverter unit having a power module, a field module, and a cooler. The cooler includes a heat transfer member having, on the one-side surface, a channel groove recessed toward the other side, a lid member, a sealing agent, and a coolant supply/discharge unit; and the lid member is fixed to the heat transfer member with a screw hole, a through hole, and a screw; and, at a position between the screw hole and the through hole, and the channel groove, a recess is provided on one or both of the one-side surface of the heat transfer member and the other-side surface of the lid member, and the sealing agent is applied on the side closer to the channel groove than the recess while no sealing agent is applied on the side closer to the screw hole than the recess.

8 Claims, 16 Drawing Sheets

(51) Int. Cl.
*H02K 1/24* (2006.01)
*H02K 11/33* (2016.01)
*H02K 9/19* (2006.01)
*H02K 7/08* (2006.01)

(52) U.S. Cl.
CPC ................ *H02K 9/19* (2013.01); *H02K 9/22* (2013.01); *H02K 11/33* (2016.01)

(58) Field of Classification Search
CPC ............ H02K 5/20; H02K 9/19; H02K 9/197; H02K 9/193; H02K 9/22; H02K 1/20; H02K 9/00; H02K 9/02; H02K 9/04; H02K 9/06; H02K 9/08; H02K 9/10; H02K 9/12; H02K 9/14; H02K 9/16; H02K 9/18
USPC ..................... 310/52, 68 R, 57, 58, 60 A, 64
See application file for complete search history.

(56) References Cited

U.S. PATENT DOCUMENTS

2019/0288582 A1\* 9/2019 Tahara ..................... H02K 9/04
2022/0060078 A1\* 2/2022 Ishikawa ................ H02K 11/21

\* cited by examiner

ROTARY ELECTRIC MACHINE

BACKGROUND OF THE INVENTION

1. Field of the Invention

The present disclosure relates to the field of rotary electric machines.

2. Description of the Background Art

A control device-integrated rotary electric machine in which a motor unit that includes a rotor and a stator and that forms a main body of the rotary electric machine, and an inverter unit that includes a power circuit and that controls electric power supplied to the motor unit are integrally configured, is mounted to a vehicle such as an automobile. The inverter unit generally includes a cooler having a channel through which a coolant flows in order to efficiently cool a power module, a field module, etc., provided in the power circuit. Examples of the coolant include water and an antifreezing solution (LLC: Long Life Coolant). The cooler includes a heat transfer member and a lid member. In order to ensure airtightness of the channel, a sealing agent is applied to a sealing agent application portion that corresponds to a surface of the heat transfer member surrounding the periphery of the channel, and the lid member is provided via the sealing agent so as to form the channel.

The following problem may arise in the cooler in which the channel is hermetically sealed by the sealing agent applied to the periphery of the channel. If a part of the sealing agent is extruded to the channel when the cooler is being formed, the extruded sealing agent receives pressure from the coolant, the sealing agent is broken, and a piece of the broken sealing agent flows into the coolant. When such a piece of the sealing agent flows into the coolant, the channel is clogged with the piece resulting in deterioration in the flow of the coolant, which may cause a decrease in the cooling performance of the cooler. In order to inhibit extrusion of the sealing agent to the channel, a configuration with an increased area of the sealing agent that faces the channel is disclosed (for example, see Patent Document 1). By increasing the area of the sealing agent that faces the channel, extrusion of the sealing agent to the channel is inhibited, and the sealing agent becomes less likely to be broken even when receiving pressure from the coolant.

Patent Document 1: Japanese Laid-Open Patent Publication No. 2018-207664

In Patent Document 1, it becomes possible to inhibit the sealing agent to break on a side of the channel by increasing the area of the sealing agent that faces the channel. However, the following problem arises in such a configuration. In the case of flowing the coolant at high pressure, the lid member and the heat transfer member provided with a channel groove should be joined with a screw in order to fix the lid member more firmly to the heat transfer member. In this case, since the lid member is fixed to the heat transfer member in which a screw hole is provided near the sealing agent application portion, the applied sealing agent is pressed and expanded to enter the screw hole, and the axial force of the screw can no longer be controlled by tightening torque.

SUMMARY OF THE INVENTION

The present disclosure aims to obtain a rotary electric machine that inhibits a sealing agent from entering a screw hole to which a lid member is fixed so as to form a channel of a coolant.

A rotary electric machine according to one aspect of the present disclosure includes: a motor unit provided with a rotary shaft, a rotor having a field core around which a field winding is wound and rotating integrally with the rotary shaft, a stator placed on an outer side of the field core in a radial direction and having a stator core around which a stator winding is wound, and a bracket covering an outer side of the field core and the stator core and holding one end side and another end side of the rotary shaft via a bearing; and an inverter unit provided with a power module having a switching element for turning on and off current supplied to the stator winding, a field module having a switching element for turning on and off current supplied to the field winding, and a cooler for cooling the power module and the field module, the inverter unit being placed on the other side of the bracket in an axial direction so as to be fixed to the bracket, wherein: the cooler is provided with a heat transfer member having, on a surface thereof on the other side in the axial direction, the power module and the field module thermally connected thereto, and having, on the surface thereof on one side in the axial direction, a channel groove recessed toward the other side in the axial direction, a lid member for closing an opening in the channel groove on the one side in the axial direction, a sealing agent for filling a gap between the heat transfer member and the lid member along the periphery of the channel groove, and a coolant supply/discharge unit for supplying/discharging a coolant to/from a channel surrounded by the channel groove and the lid member; the lid member is fixed to the heat transfer member with a screw hole provided in the outer circumference of a surface of the heat transfer member on the one side in the axial direction, a through hole provided at a portion of the lid member which faces the screw hole, and a screw screwed into the screw hole through the through hole; and, at a position between the screw hole and the through hole, and the channel groove, a recess is provided on one or both of the surface of the heat transfer member on the one side in the axial direction and the surface of the lid member on the other side in the axial direction, and the sealing agent fills a portion on the side closer to the channel groove than the recess while no sealing agent is applied on the side closer to the screw hole than the recess.

In the rotary electric machine according to one aspect of the present disclosure, at the position between the screw hole and the through hole, and the channel groove, the recess which receives the sealing agent is provided on one or both of the surface of the heat transfer member on the one side in the axial direction and the surface of the lid member on the other side in the axial direction, and the sealing agent which is pressed and expanded when the lid member is being fixed to the heat transfer member, flows into the recess, thereby inhibiting the sealing agent from entering the screw hole to which the lid member is fixed so as to form the channel groove for the coolant. Since the sealing agent is inhibited from entering the screw hole, the axial force of the screw for fixing the lid member to the heat transfer member can be controlled by tightening torque.

DETAILED DESCRIPTION OF THE PREFERRED EMBODIMENTS OF THE INVENTION

Figure 1:
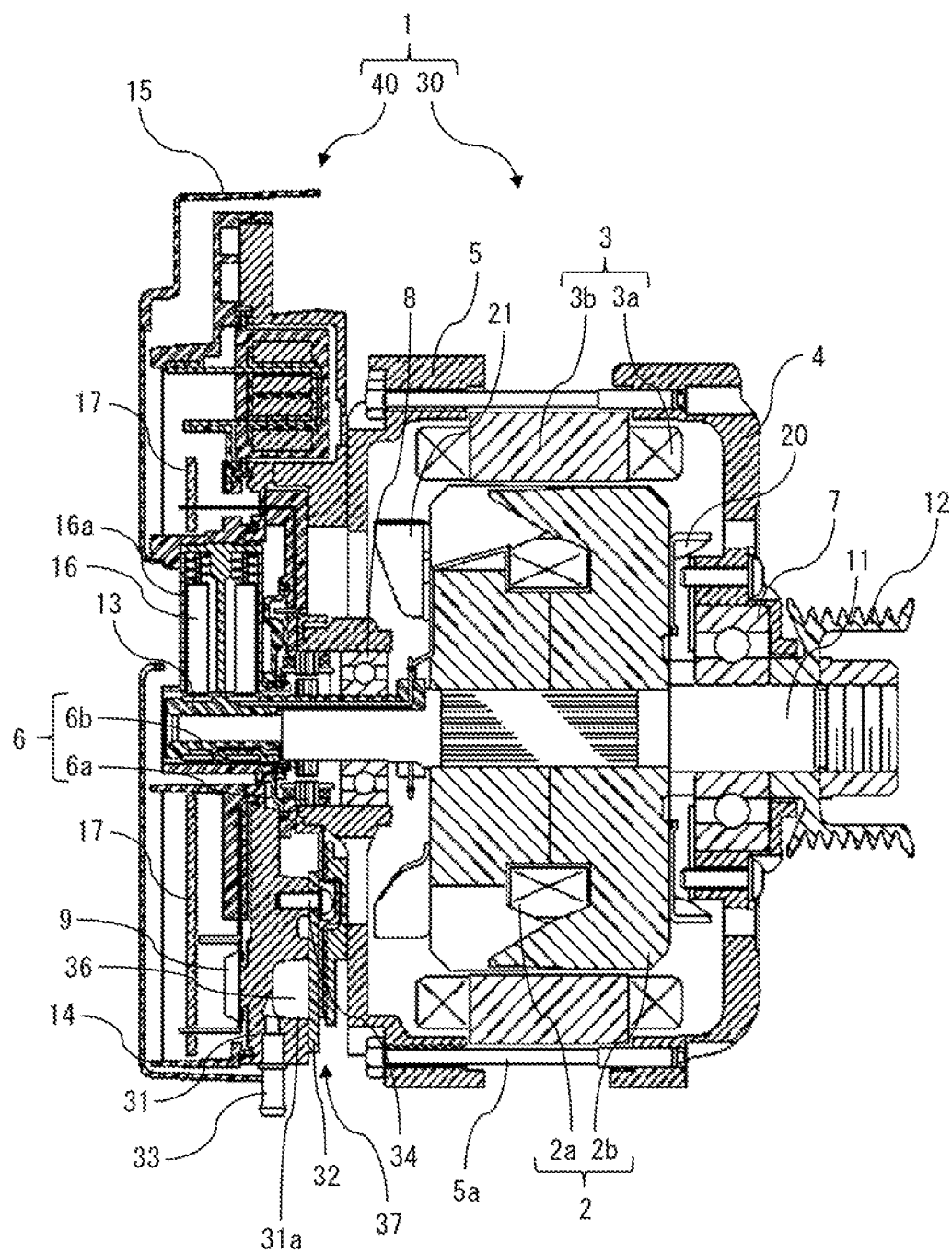
FIG. 1 is a cross-sectional view schematically illustrating a rotary electric machine according to a first embodiment of the present disclosure.

Hereinafter, a rotary electric machine according to the embodiments of the present disclosure will be described with reference to the drawings. Identical or corresponding members and parts in the drawings are explained with the same reference characters.

First Embodiment

Figure 2:
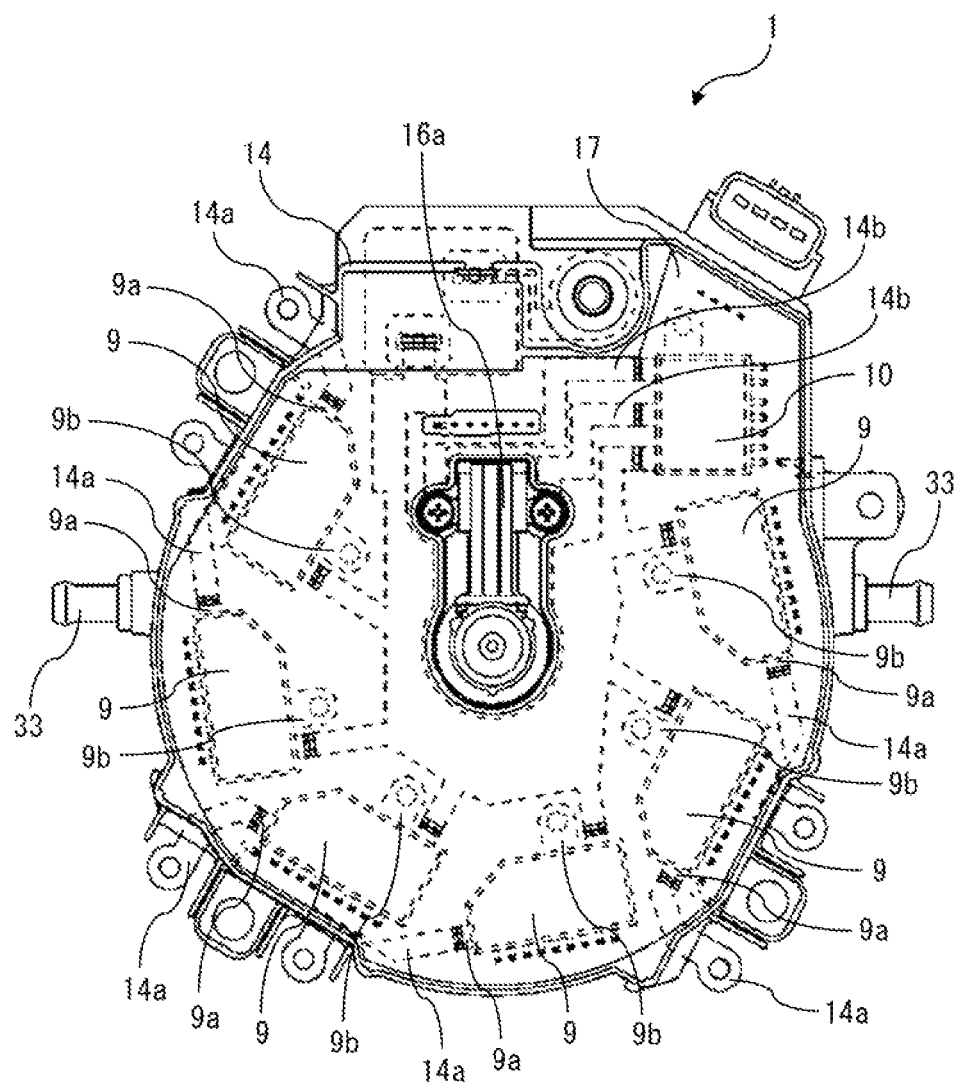
FIG. 2 is a plan view illustrating the rotary electric machine, on a side of an inverter unit, according to the first embodiment of the present disclosure.
Figure 3:
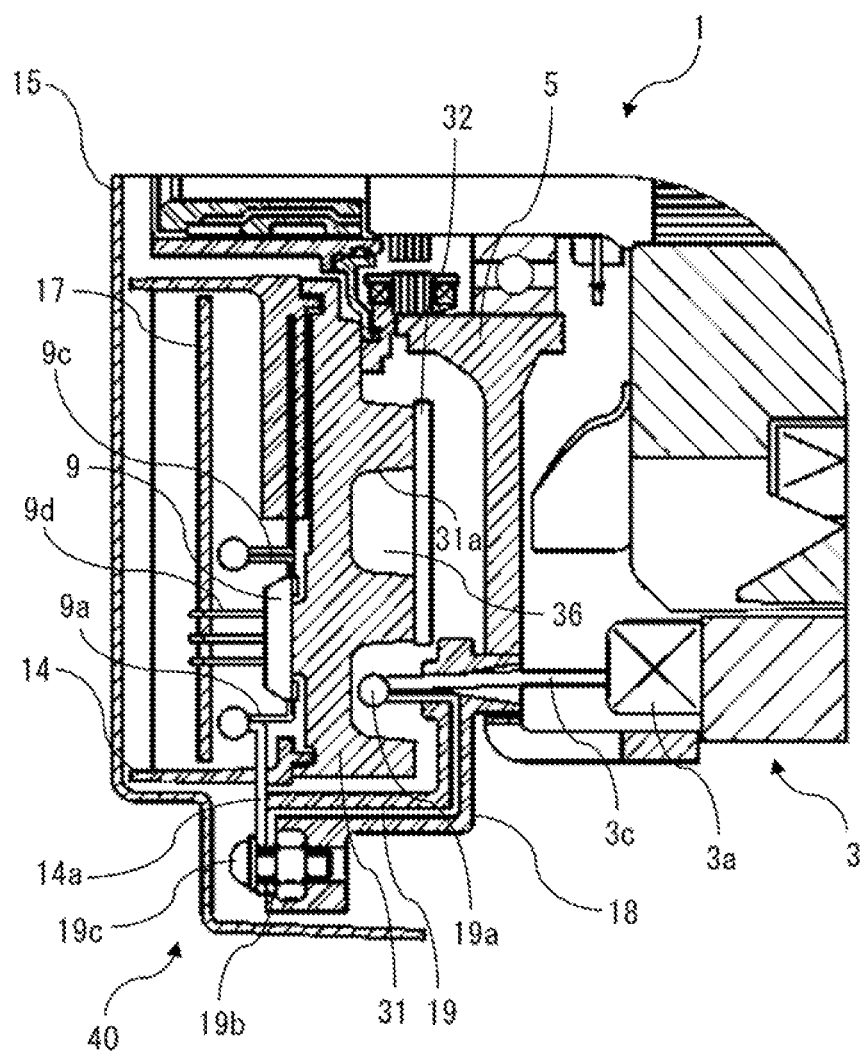
FIG. 3 is a cross-sectional view illustrating a connection between the inverter unit and a stator of the rotary electric machine according to the first embodiment of the present disclosure.
Figure 4:
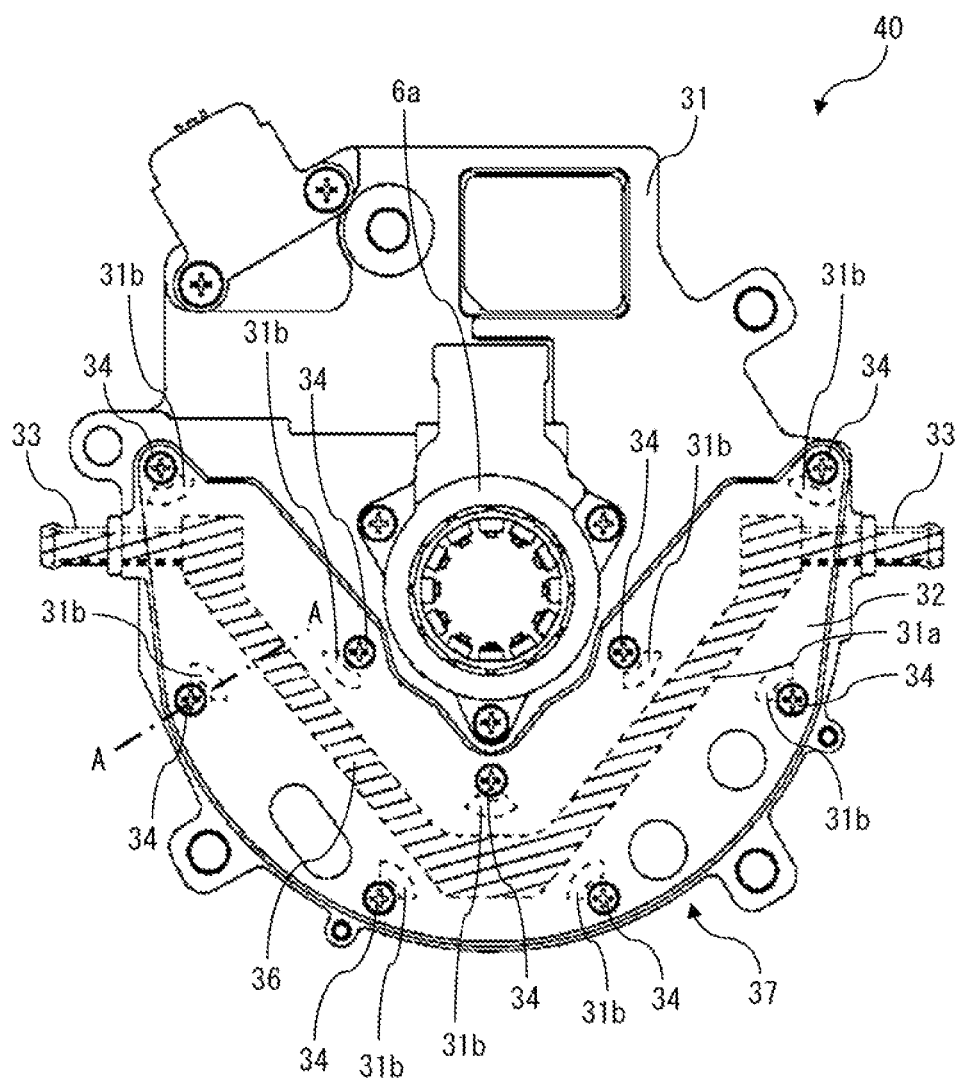
FIG. 4 is a plan view illustrating the inverter unit, on a side of a motor unit, in the rotary electric machine according to the first embodiment of the present disclosure.
Figure 5:
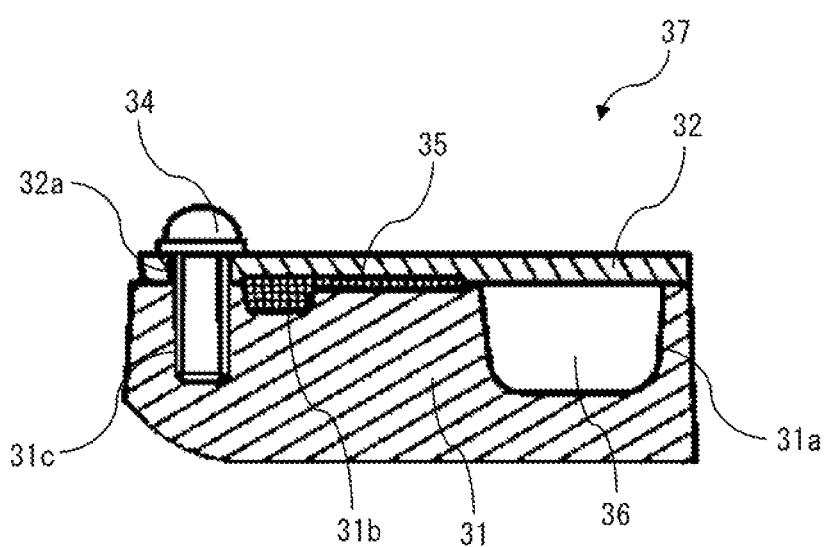
FIG. 5 is a cross-sectional view of a main section of the inverter unit cut at an A-A cross-sectional position in FIG. 4.
Figure 6:
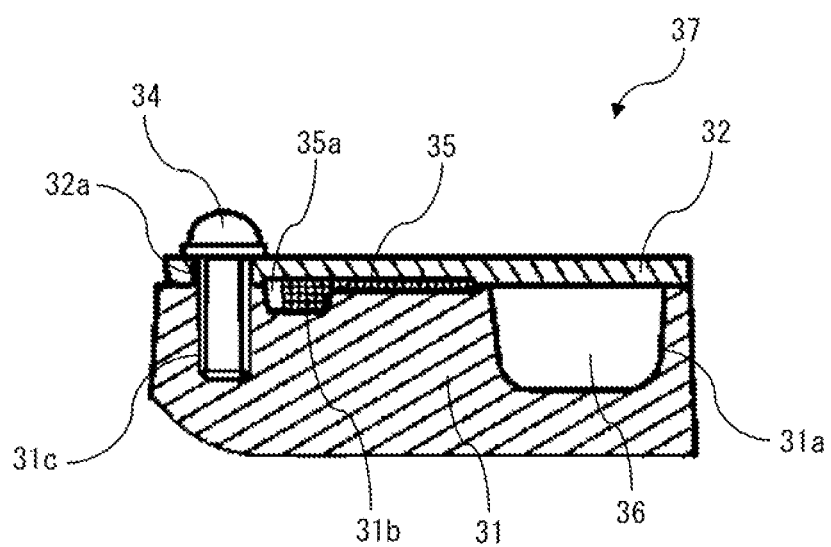
FIG. 6 is a cross-sectional view of the main section of another inverter unit cut at the A-A cross-sectional position in FIG. 4.

FIG. 1 is a cross-sectional view schematically illustrating a rotary electric machine 1 according to the first embodiment, FIG. 2 is a plan view illustrating the rotary electric machine 1, on a side of an inverter unit 40, with a rear cover 15 having been removed therefrom, FIG. 3 is a cross-sectional view illustrating a connection between the inverter unit 400 and a stator 3 of the rotary electric machine 1, FIG. 4 is a plan view illustrating the inverter unit 40, on a side of a motor unit 30, in the rotary electric machine 1, FIG. 5 is a cross-sectional view of a main section of the inverter unit 40 cut at an A-A cross-sectional position in FIG. 4, and FIG. 6 is a cross-sectional view of the main section of another inverter unit 40 cut at the A-A cross-sectional position in FIG. 4. In FIG. 2, internal components of the inverter unit 40 are indicated with dashed lines. The rotary electric machine 1 is a control device-integrated rotary electric machine 1 comprising the motor unit 30 and the inverter unit 40. The motor unit 30 includes a rotor 2 and a stator 3, and operates as an electric motor which drives an internal combustion engine (not shown). Alternatively, the motor unit 30 functions as an electric generator which is driven by an internal combustion engine so as to generate electricity. The inverter unit 40 is arranged side by side with the motor unit 30 on the other side in an axial direction of the motor unit 30 so as to control electric power supplied to the motor unit 30. The inverter unit 40 is fixed to the motor unit 30 such that the motor unit 30 and the inverter unit 40 are integrated with each other.

<Motor Unit 30>

The motor unit 30 includes a rotary shaft 11, a rotor 2 which rotates integrally with the rotary shaft 11, a stator 3 arranged on the outer side of the rotor 2, and a bracket which houses these components therein and holds the rotary shaft 11 in a rotatable manner.

The rotor 2 includes a field winding 2a and a field core 2b having the field winding 2a wound therearound. The stator 3 arranged on the outer side of the field core 2b in a radial direction includes a multi-phase stator winding 3a and a stator core 3b having the stator winding 3a wound therearound. The multi-phase stator winding 3a is, for example, a pair of three phase windings or two pairs of three phase windings, but is not limited thereto and could be set in accordance with the type of rotary electric machine. The bracket covers the outer side of the stator core 3b and the field core 2b. The bracket includes a front bracket 4 and a rear bracket 5. The front bracket 4 holds one end side of the rotary shaft 11 via a bearing 7 and covers a front side, that is one side, of the rotor 2 and the stator 3. The rear bracket 5 holds the other end side of the rotary shaft 11 via a bearing 8 and covers a rear side, that is the other side, of the rotor 2 and the stator 3. The front bracket 4 and the rear bracket 5 are connected by a bolt 5a with space therebetween in the axial direction.

The rotary shaft 11 has a pulley 12 at an end on the one end side of the rotary shaft 11 which projects through a through hole of the front bracket 4. The pulley 12 applies and receives torque bidirectionally to/from the rotor 2 and the internal combustion engine (not shown) placed on the outside. The pulley 12 and the internal combustion engine are connected via a belt (not shown). The rotary shaft 11 has a slip ring 13 on the other end side of the rotary shaft 11 which projects through a through hole of the rear bracket 5. The slip ring 13 and the field winding 2a are electrically connected to each other and field current is supplied from the slip ring 13 to the field winding 2a. A brush holder 16a holds a brush 16 which is slidable with respect to the slip ring 13 and which supplies current to the field winding 2a. The brush holder 16a is placed in a space through which the rotary shaft 11 provided at the center of the inverter unit 40 penetrates, after the mounting, to the motor unit 30, of the inverter unit 40 to which the rear cover 15 has not been attached yet. The brush holder 16a is fixed to the inverter unit 40.

An air cooling fan 20 is fixed to an end surface, on the front side, of the field core 2b of the rotor 2. An air cooling fan 21 is fixed to an end surface, on the rear side, of the field core 2b of the rotor 2. The air cooling fan 20 and the air cooling fan 21 rotate integrally with the rotor 2. Cooling air is generated in accordance with the rotations of the air cooling fan 20 and the air cooling fan 21 so as to cool the inside of the bracket. Furthermore, a gap serving as a cooled air passage is provided between a cooler 37 and a rear bracket 5 in the inverter unit 40, and cooled air passes through the cooled air passage to cool the cooler 37.

A magnetic pole position detecting sensor 6 is configured by a sensor stator 6a and a sensor rotor 6b. The sensor rotor 6b is provided in the rotary shaft 11 between the slip ring 13 and the bearing 8 on the other end side of the rotary shaft 11 which projects through the rear bracket 5. The sensor rotor 6b rotates integrally with the rotary shaft 11 and is formed of an iron core. The sensor stator 6a is arranged coaxially with the sensor rotor 6b and is provided in a heat transfer member 31 of the inverter unit 40. The magnetic pole position detecting sensor 6 detects the magnetic pole position of the rotary shaft 11, that is the rotor 2, on the basis of the position of the sensor rotor 6b.

<Inverter Unit 40>

The inverter unit 40 includes: a power module 9 and a field module 10 which supply electric power to the motor unit 30; a control module 17 which controls the power module 9 and the field module 10; the cooler 37 which cools the power module 9 and the field module 10; a case 14 provided with a terminal 14a which electrically connects the power module 9 and the field module 10; and the rear cover 15 which covers these components from the rear side and the outer side in the radial direction. The inverter unit 40 is arranged on the other side of the rear bracket 5 in the axial direction and fixed to the rear bracket 5. In the present embodiment, the inverter unit 40 includes six power modules 9, but the number of power modules 9 is not limited thereto.

The power module 9 includes a switching element and a peripheral circuit. The power module 9 is connected to a stator lead-out wire 3c via the terminal 14a and a terminal 19. The switching element is placed on a lead frame which forms an electrical wiring and sealed together with the peripheral circuit by a resin material. An AC terminal 9a, a ground terminal 9b, an input terminal 9c, and a control terminal 9d in the power module 9 are provided so as to be exposed from the resin material. The switching element turns on/off current supplied from a DC power supply to the stator winding 3a at the time of driving so as to supply stator current to the stator winding 3a. The switching element rectifies stator current during power generation.

The field module 10 includes a switching element and a peripheral circuit. The field module 10 is connected to the field winding 2a via a terminal 14b, the brush 16, and the slip ring 13. The switching element is placed on a lead frame which forms an electrical wiring and sealed together with the peripheral circuit by a resin material. The switching element turns on/off current supplied to the field winding 2a so as to control field current.

The control module 17 includes a control circuit that controls the power module 9 and the field module 10. The control module 17 is provided in, for example, a substrate having electronic components mounted thereon. The control module 17 is arranged, on the other side in the axial direction with respect to the power module 9 and the field module 10, spaced apart from the power module 9 and the field module 10. The control terminal 9d of the power module 9 is connected to the control module 17. A signal wire of the magnetic pole position detecting sensor 6 is connected to the control module 17.

The case 14 is provided so as to surround the power module 9, the field module 10, and the control module 17 from the outer side in the radial direction. The case 14 is made of a resin material which has an insulating property. Examples of the resin material include polyphenylene sulfide. The case 14 is electrically connected to the power module 9 on the other end side as illustrated in FIG. 2, and has the terminal 14a which projects from the case 14 on the one end side. The terminal 14a is a terminal for connecting the power module 9 and the motor unit 30. The terminal 14a is formed integrally with the case 14 by insert molding.

<Configuration of Connection Between the Stator 3 and the Inverter Unit 40>

Hereinafter, the configuration of an electrical connection between the stator 3 and the inverter unit 40 will be discussed. The rotary electric machine 1 includes a connecting board 18 as illustrated in FIG. 3. The connecting board 18 is a board having the terminal 19 for electrically connecting the stator 3 and the inverter unit 40 formed thereon by insert molding. The connecting board 18 is arranged between the inverter unit 40 and the rear bracket 5 and fixed to the rear bracket 5 with a screw (not shown).

The stator lead-out wire 3c forms an end of the stator winding 3a. The stator lead-out wire 3c passes through the rear bracket 5 and is connected to the terminal 19 by welding at a connection portion 19a, on the one end side, of the terminal 19 provided in the connecting board 18. After establishing the connection therebetween, the inverter unit 40 to which the rear cover 15 has not been attached yet, is mounted to the rear side of the rear bracket 5 in the axial direction. The one end side of the terminal 14a provided in the case 14, is connected to the terminal 19 with a screw 19c at a connection portion 19b, on the other end side, of the terminal 19. The AC terminal 9a of the power module 9 and the other end side of the terminal 14a are joined by welding or the like. The ground terminal 9b (not shown in FIG. 3) of the power module 9 is fixed to the heat transfer member 31 with a screw (not shown). The ground terminal 9b and the heat transfer member 31 are electrically connected and the heat transfer member 31 functions as a ground.

<Cooler 37>

Hereinafter, the cooler 37 which is a main section of the present disclosure will be discussed. The cooler 37 includes the heat transfer member 31, a lid member 32, a sealing agent 35, and a coolant input/output pipe 33 serving as a coolant supply/discharge unit. The heat transfer member 31 has, on a surface on the other side in the axial direction, the power module 9 and the field module 10 being thermally connected thereto, and has, on a surface on the one side in the axial direction, a channel groove 31a recessed toward the other side in the axial direction. The plate-shaped lid member 32 is provided so as to close an opening of the channel groove 31a on the one side in the axial direction. The heat transfer member 31 and the lid member 32 are made of a metallic material such as aluminum. The sealing agent 35 is applied along the periphery of the channel groove 31a so as to fill a gap between the heat transfer member 31 and the lid member 32. Examples of material for the sealing agent 35 include silicone resin, fluorine-based silicone resin, and epoxy resin, but are not limited thereto. The coolant input/output pipe 33 is provided on a side surface of the heat transfer member 31, and supplies/discharges the coolant to a channel 36 surrounded by the channel groove 31a and the lid member 32. Examples of the coolant include water, an antifreezing solution, and an ethylene glycol solution. The heat transfer member 31 is cooled by the coolant.

As illustrated in FIG. 5, the lid member 32 is fixed to the heat transfer member 31 with a screw hole 31c provided in the outer circumference of the surface of the heat transfer member 31 on the one side in the axial direction, a through hole 32a provided at a portion of the lid member 32 which faces the screw hole 31c, and a screw 34 screwed into the screw hole 31c through the through hole 32a. The lid member 32 is fixed to the heat transfer member 31, and the sealing agent 35 applied along the periphery of the channel groove 31a fills a gap between the lid member 32 and the heat transfer member 31, thereby hermetically sealing the channel 36. In FIG. 4, a portion surrounded by dashed lines and indicated by hatching is a portion through which the coolant flows in the radial direction, that is, the channel 36 and the coolant input/output pipe 33.

At a position between the screw hole 31c and the through hole 32a, and the channel groove 31a, a recess is provided on one or both of a surface of the heat transfer member 31 on the one side in the axial direction and a surface of the lid member 32 on the other side in the axial direction. In the present embodiment, as illustrated in FIG. 5, a recess 31b is provided on the surface of the heat transfer member 31 on the one side in the axial direction. For example, the recess 31b is provided along the periphery of the screw 34 on a side closer to the channel groove 31a, as illustrated in FIG. 4. The recess 31b is provided for receiving the sealing agent 35 so as to prevent the sealing agent 35 which is pressed and expanded when the lid member 32 is being fixed to the heat transfer member 31, from reaching and entering the screw hole 31c. The sealing agent 35 fills a portion on a side closer to the channel groove 31a than the recess 31b, and no sealing agent 35 is applied to a portion on a side closer to the screw hole 31c than the recess 31b. Note that, in FIG. 5, the recess 31b is filled in with the sealing agent 35, but it is not necessary to fill the recess 31b with the sealing agent 35. As illustrated in FIG. 6, a space 35a where no sealing agent 35 exists may be present in the recess 31b on the side closer to the screw hole 31c, and there is no problem even if no sealing agent 35 enters the recess 31b. The sealing agent 35 is applied to a portion between the channel groove 31a and the recess 31b on the surface of the heat transfer member 31 on the one side in the axial direction, before the lid member 32 is fixed to the heat transfer member 31. FIG. 5 and FIG. 6 schematically show that the sealing material 35 is applied and expanded over a space between the heat transfer member 31 and the lid member 32, and in the first embodiment, no recess such as a groove is provided in a portion on a surface to which the sealing agent 35 is applied.

This configuration allows the sealing agent 35 which is pressed and expanded when the lid member 32 is being fixed to the heat transfer member 31, to enter the recess 31b which receives the sealing agent 35 before reaching the screw hole 31c. Accordingly, the sealing agent 35 is prevented from reaching and entering the screw hole 31c, and thus, it becomes possible to inhibit the sealing agent 35 from entering the screw hole 31c. Since the sealing agent 35 is inhibited from entering the screw hole 31c, the axial force of the screw 34 for fixing the lid member 32 to the heat transfer member 31 can be controlled by tightening torque.

As discussed above, in the rotary electric machine 1 according to the first embodiment, the recess 31b which receives the sealing agent 35 is provided at a position between the screw hole 31c and the channel groove 31a on the surface of the heat transfer member 31 on the one side in the axial direction, and the sealing agent 35 which is pressed and expanded when the lid member 32 is being fixed to the heat transfer member 31, enters the recess 31b, thereby inhibiting the sealing agent 35 from entering the screw hole 31c to which the lid member 32 is fixed so as to form the channel 36 for the coolant. Since the sealing agent 35 is inhibited from entering the screw hole 31c, the axial force of the screw 34 for fixing the lid member 32 to the heat transfer member 31 can be controlled by tightening torque. Since the axial force of the screw 34 is controlled by tightening torque, the channel 36 for the coolant can be stably and hermetically sealed in the long term.

Second Embodiment

Figure 7:
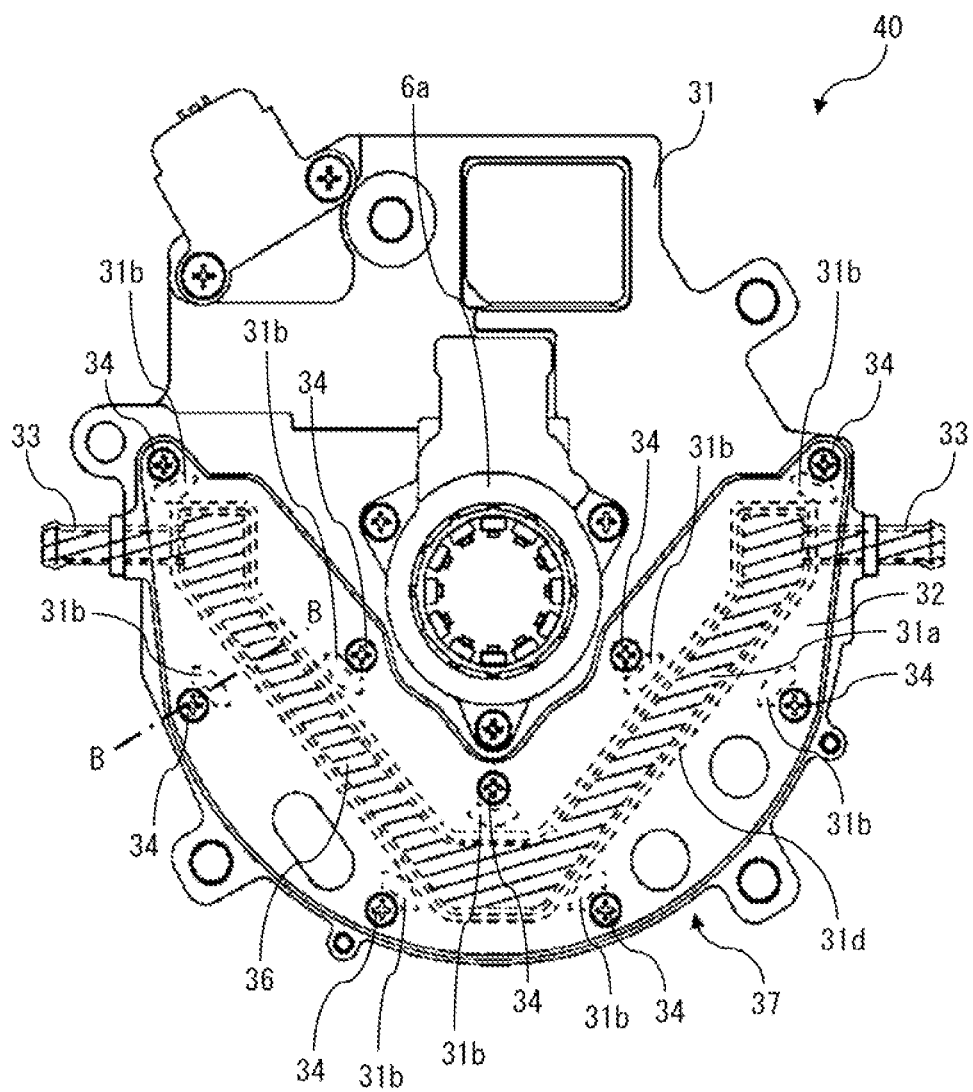
FIG. 7 is a plan view illustrating an inverter unit, on a side of a motor unit, in a rotary electric machine according to the second embodiment of the present disclosure.
Figure 8:
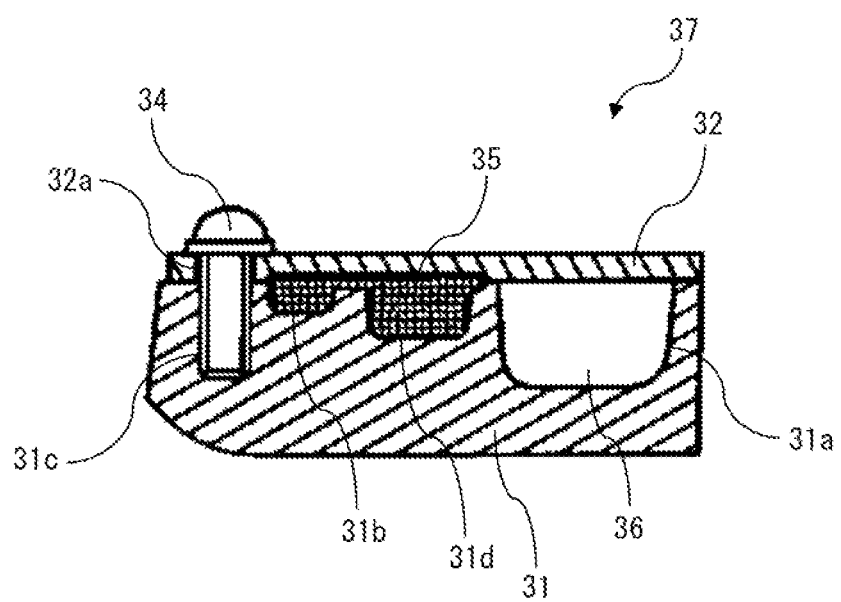
FIG. 8 is a cross-sectional view of a main section of the inverter unit cut at a B-B cross-sectional position in FIG. 7.

Hereinafter, a rotary electric machine 1 according to the second embodiment will be described. FIG. 7 is a plan view illustrating the inverter unit 40, on a side of the motor unit 30, in the rotary electric machine 1 according to the second embodiment, and FIG. 8 is a cross-sectional view of a main section of the inverter unit 40 cut at a B-B cross-sectional position in FIG. 7. The rotary electric machine 1 according to the second embodiment has a configuration of providing a groove-side recess 31d in the heat transfer member 31.

In the present embodiment, as illustrated in FIG. 8, the recess 31b is provided on the surface of the heat transfer member 31 on the one side in the axial direction. The groove-side recess 31d is provided along the periphery of the channel groove 31a on the surface of the heat transfer member 31 on the one side in the axial direction, that is a portion to be filled with the sealing agent 35. In FIG. 7, a portion surrounded by dashed lines along the periphery of the channel groove 31a corresponds to the groove-side recess 31d. In the present embodiment, the sealing agent 35 fills the groove-side recess 31d provided between the channel groove 31a and the recess 31b, before the lid member 32 is fixed to the heat transfer member 31.

In the present embodiment, the recess 31b is provided on the surface of the heat transfer member 31 on the one side in the axial direction, but the position of the recess is not limited thereto. The recess may be provided on the surface of the lid member 32 on the other side in the axial direction, in a position between the through hole 32a and the channel groove 31a. The recess may be provided on both of the surface of the heat transfer member 31 on the one side in the axial direction and the surface of the lid member 32 on the other side in the axial direction.

As discussed above, in the rotary electric machine 1 of the second embodiment, the groove-side recess 31d is provided along the periphery of the channel groove 31a on the surface of the heat transfer member 31 on the one side in the axial direction, and the sealing agent 35 fills the groove-side recess 31d. Thus, when the sealing agent 35 fills the groove-side recess 31d, it becomes possible to prevent the sealing agent 35 from flowing into the channel groove 31a and the like around the groove-side recess 31d. In addition, since it is easy to determine a position to which the sealing agent 35 is applied, the productivity of the rotary electric machine 1 can be improved.

Third Embodiment

Figure 9:
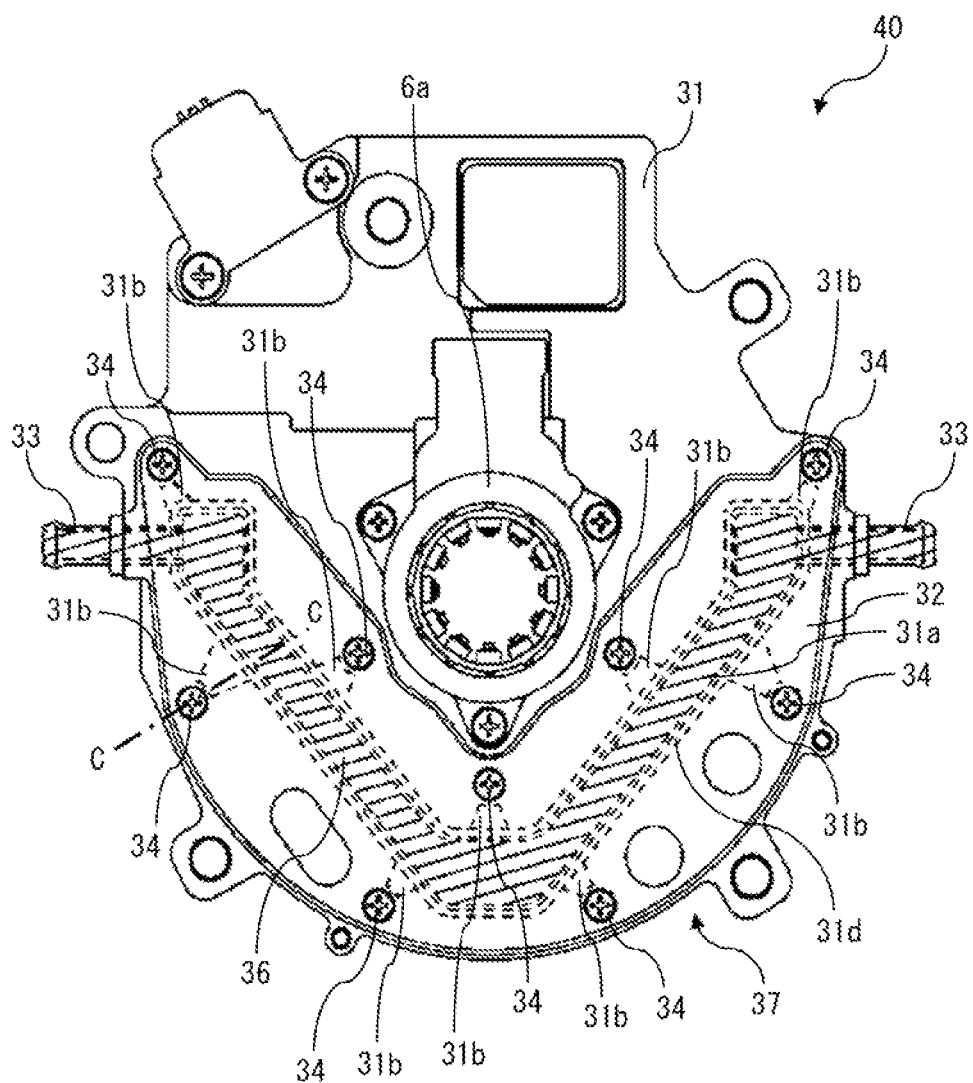
FIG. 9 is a plan view illustrating an inverter unit, on a side of a motor unit, in a rotary electric machine according to the third embodiment of the present disclosure.
Figure 10:
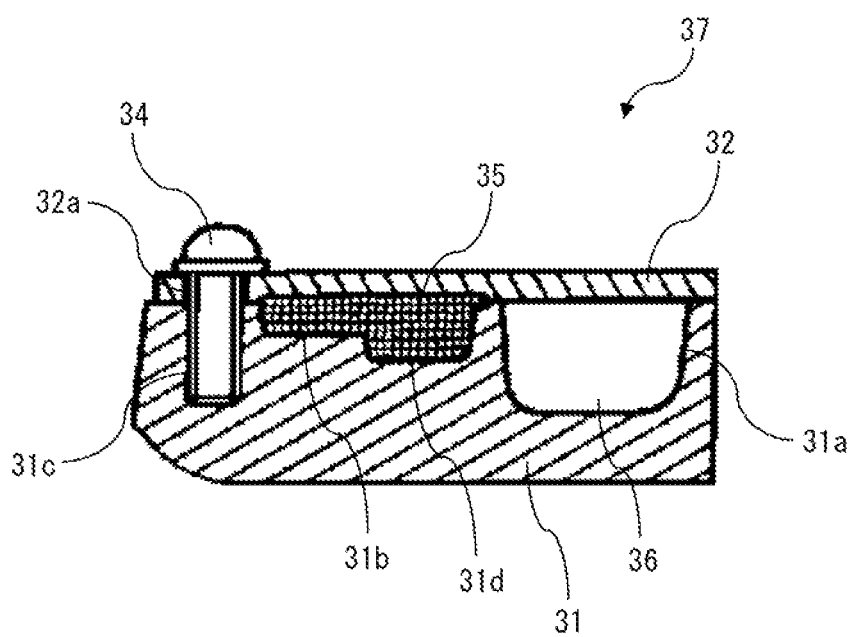
FIG. 10 is a cross-sectional view of a main section of the inverter unit cut at a C-C cross-sectional position in FIG. 9.

Hereinafter, a rotary electric machine 1 according to the third embodiment will be described. FIG. 9 is a plan view illustrating the inverter unit 40, on a side of the motor unit 30, in the rotary electric machine 1 according to the third embodiment, and FIG. 10 is a cross-sectional view of a main section of the inverter unit 40 cut at a C-C cross-sectional position in FIG. 9. The rotary electric machine 1 according to the third embodiment has a configuration wherein the recess 31b and the groove-side recess 31d provided in the heat transfer member 31 are communicated with each other.

In the present embodiment, as illustrated in FIG. 10, the recess 31b is provided on the surface of the heat transfer member 31 on the one side in the axial direction. The groove-side recess 31d is provided along the periphery of the channel groove 31a on the surface of the heat transfer member 31 on the one side in the axial direction, that is a portion to be filled with the sealing agent 35. In FIG. 9, a portion surrounded by dashed lines along the periphery of the channel groove 31a corresponds to the groove-side recess 31d. The recess 31b extends towards the groove-side recess 31d on the surface of the heat transfer member 31 on the one side in the axial direction, and the recess 31b and the groove-side recess 31d are communicated with each other on the surface of the heat transfer member 31 on the one side in the axial direction. The recess 31b has a depth shallower than that of the groove-side recess 31d. In the present embodiment, the sealing agent 35 fills the groove-side recess 31d provided between the channel groove 31a and the recess 31b, before the lid member 32 is fixed to the heat transfer member 31. Since the groove-side recess 31d and the recess 31b have different depths such that the groove-side recess 31d is deeper than the recess 31b, the sealing agent 35 is filled in the groove-side recess 31d preferentially.

As discussed above, in the rotary electric machine 1 in the third embodiment, the recess 31b is provided on the surface of the heat transfer member 31 on the one side in the axial direction, and the recess 31b and the groove-side recess 31d are communicated with each other on the surface of the heat transfer member 31 on the one side in the axial direction. Thus, since a portion for receiving the sealing agent 35 is enlarged between the screw hole 31c and the groove-side recess 31d to be filled with the sealing agent 35, it is possible to achieve a configuration of further preventing the sealing agent 35 which is pressed and expanded when the lid member 32 is being fixed to the heat transfer member 31, from reaching the screw hole 31c. Furthermore, since the recess 31b is shallower than the groove-side recess 31d, it becomes possible to fill the sealing agent 35 in the groove-side recess 31d preferentially.

Fourth Embodiment

Figure 11:
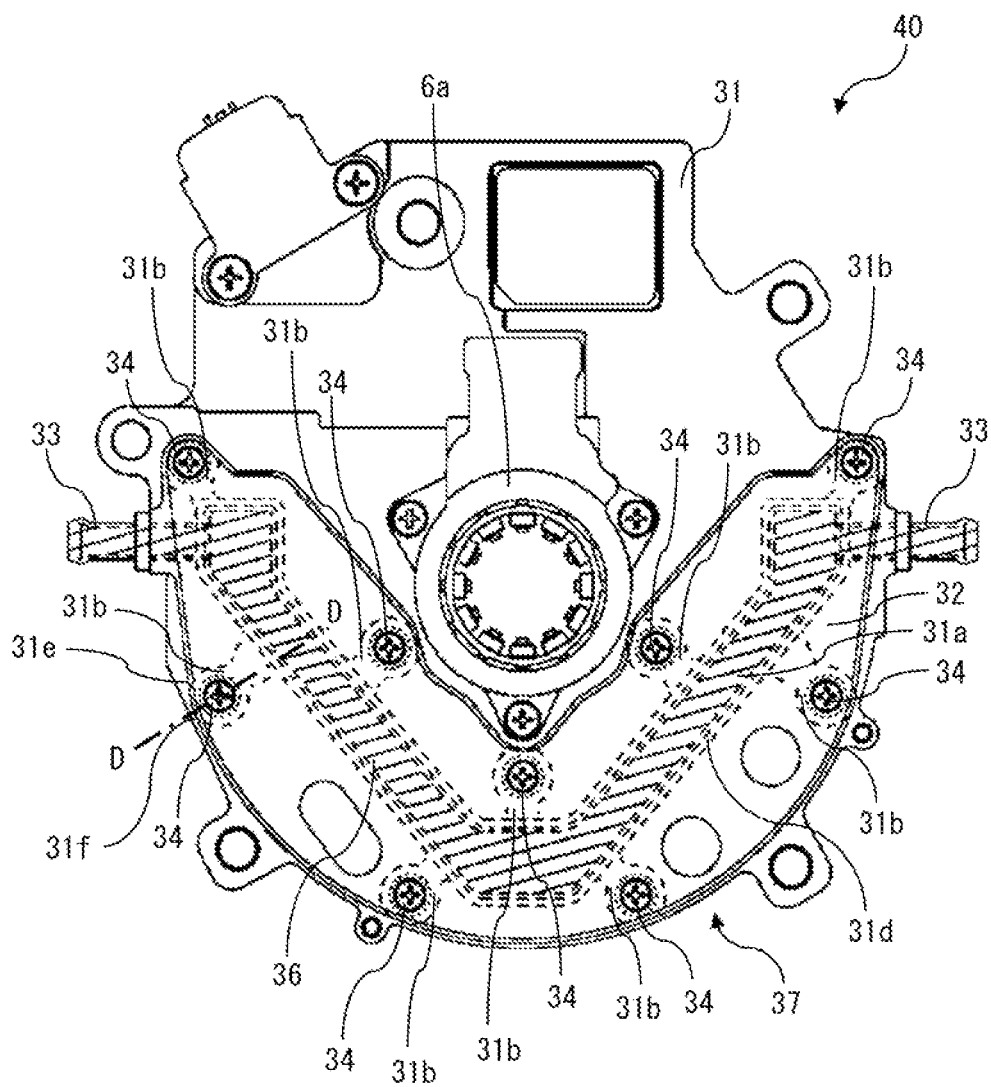
FIG. 11 is a plan view illustrating an inverter unit, on a side of a motor unit, in a rotary electric machine according to the fourth embodiment of the present disclosure.
Figure 12:
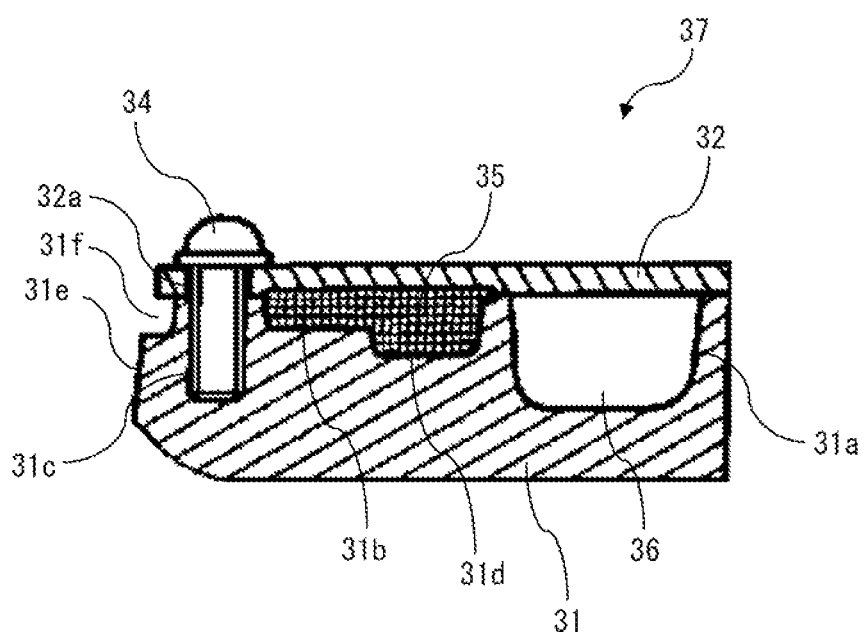
FIG. 12 is a cross-sectional view of a main section of the inverter unit cut at a D-D cross-sectional position in FIG. 11.

Hereinafter, a rotary electric machine 1 according to the fourth embodiment will be described. FIG. 11 is a plan view illustrating the inverter unit 40, on a side of the motor unit 30, in a rotary electric machine 1 according to the fourth embodiment, and FIG. 12 is a cross-sectional view of a main section of the inverter unit 40 cut at a D-D cross-sectional position in FIG. 11. The rotary electric machine 1 according to the fourth embodiment has a configuration wherein the recess 31b provided in the heat transfer member 31 and a side portion 31e of the heat transfer member 31 are communicated with each other.

In the present embodiment, as illustrated in FIG. 12, the recess 31b is provided on the surface of the heat transfer member 31 on the one side in the axial direction. The groove-side recess 31d is provided along the periphery of the channel groove 31a on the surface of the heat transfer member 31 on the one side in the axial direction, that is a portion to be filled with the sealing agent 35. In FIG. 11, a portion surrounded by dashed lines along the periphery of the channel groove 31a corresponds to the groove-side recess 31d. The recess 31b extends towards the groove-side recess 31d on the surface of the heat transfer member 31 on the one side in the axial direction, and the recess 31b and the groove-side recess 31d are communicated with each other on the surface of the heat transfer member 31 on the one side in the axial direction. The recess 31b extends along the periphery of the screw hole 31c on the surface of the heat transfer member 31 on the one side in the axial direction such that the recess 31b and the screw hole 31c are spaced from each other, and the recess 31b and the side portion 31e of the heat transfer member 31 are communicated with each other. In FIG. 12, a communication portion 31f is a portion where the recess 31b and the side portion 31e are communicated with each other. The recess 31b is shallower than the groove-side recess 31d. In the present embodiment, the sealing agent 35 fills the groove-side recess 31d provided between the channel groove 31a and the recess 31b, before the lid member 32 is fixed to the heat transfer member 31.

As discussed above, in the rotary electric machine 1 in the fourth embodiment, the recess 31b provided on the surface of the heat transfer member 31 on the one side in the axial direction is communicated with the side portion 31e of the heat transfer member 31. Thus, since a portion for receiving the sealing agent 35 in the recess 31b is enlarged, it is possible to achieve a configuration of further preventing the sealing agent 35 which is pressed and expanded when the lid member 32 is being fixed to the heat transfer member 31, from reaching the screw hole 31c. Besides, since the recess 31b is communicated with the side portion 31e of the heat transfer member 31, the sealing agent 35 which has entered the recess 31b can be confirmed in the side portion 31e through visual observation, thereby enabling easy control of the filling amount of the sealing agent 35. Furthermore, since it is easy to control the filling amount of the sealing agent 35, the productivity of the rotary electric machine 1 can be improved.

Fifth Embodiment

Figure 13:
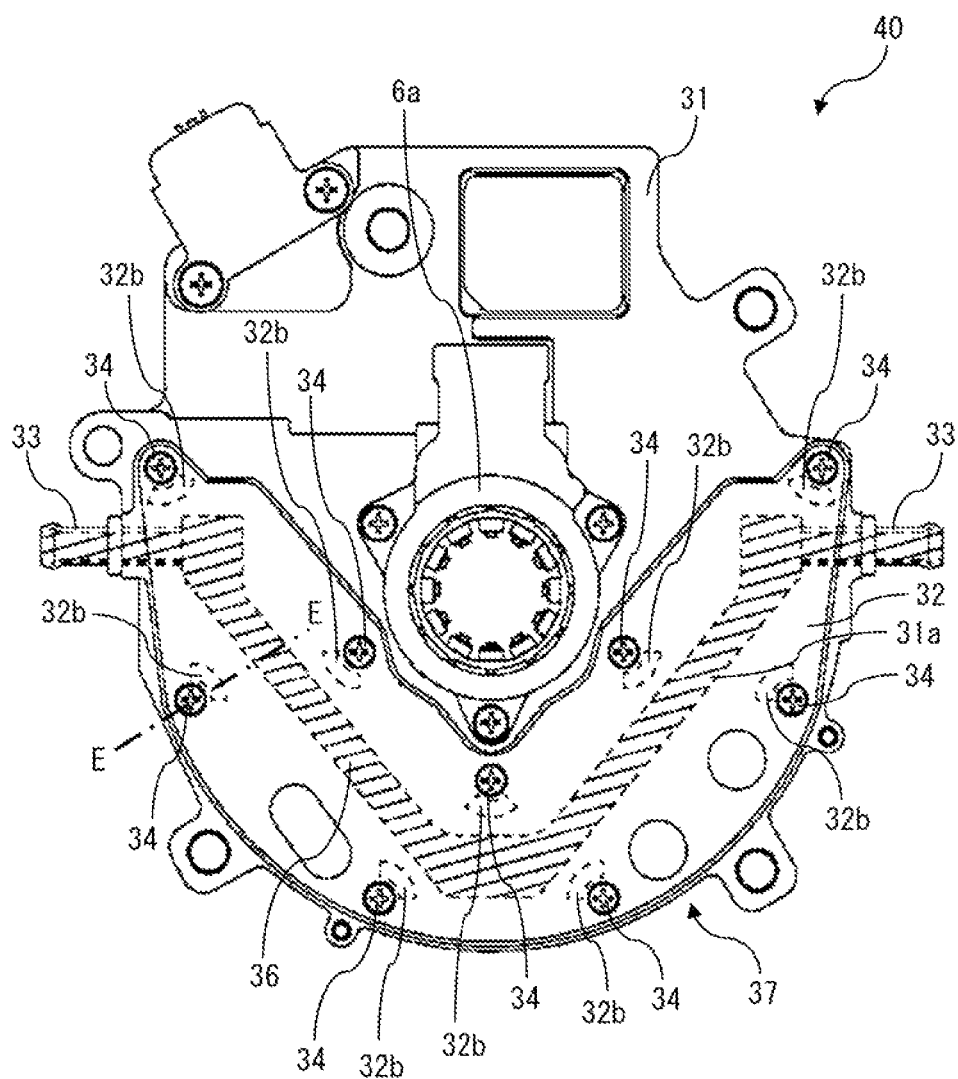
FIG. 13 is a plan view illustrating an inverter unit, on a side of a motor unit, in a rotary electric machine according to the fifth embodiment of the present disclosure.
Figure 14:
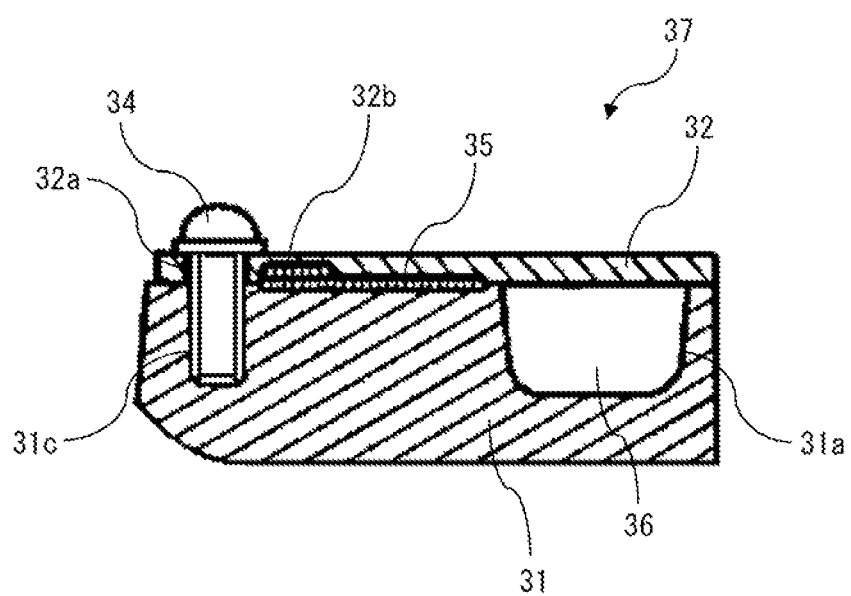
FIG. 14 is a cross-sectional view of a main section of the inverter unit cut at an E-E cross-sectional position in FIG. 13.

Hereinafter, a rotary electric machine 1 according to the fifth embodiment will be described. FIG. 13 is a plan view illustrating the inverter unit 40, on a side of the motor unit 30, in a rotary electric machine 1 according to the fifth embodiment, and FIG. 14 is a cross-sectional view of a main section of the inverter unit 40 cut at an E-E cross-sectional position in FIG. 13. The rotary electric machine 1 according to the fifth embodiment has a configuration of providing a recess 32b on the surface of the lid member 32 on the other side in the axial direction.

In the present embodiment, as illustrated in FIG. 14, the recess 32b is provided at a position between the through hole 32a and the channel groove 31a on the surface of the lid member 32 on the other side in the axial direction. For example, the recess 32b is provided along the periphery of the screw 34 on a side closer to the channel groove 31a, as illustrated in FIG. 13. The recess 32b is provided for receiving the sealing agent 35 so as to prevent the sealing agent 35 which is pressed and expanded when the lid member 32 is being fixed to the heat transfer member 31, from reaching and entering the screw hole 31c. The sealing agent 35 fills a portion on a side closer to the channel groove 31a than the recess 32b, and no sealing agent 35 is applied to a portion on a side closer to the screw hole 31c than the recess 32b. The sealing agent 35 is applied to a portion between the channel groove 31a and the recess 32b on the surface of the heat transfer member 31 on the one side in the axial direction, before the lid member 32 is fixed to the heat transfer member 31.

As discussed above, in the rotary electric machine 1 according to the fifth embodiment, the recess 32b which receives the sealing agent 35 is provided at a position between the through hole 32a and the channel groove 31a on the surface of the lid member 32 on the other side in the axial direction, and the sealing agent 35 which is pressed and expanded when the lid member 32 is being fixed to the heat transfer member 31, enters the recess 32b, thereby inhibiting the sealing agent 35 from entering the screw hole 31c to which the lid member 32 is fixed so as to form the channel 36 for the coolant. Since the sealing agent 35 is inhibited from entering the screw hole 31c, the axial force of the screw 34 for fixing the lid member 32 to the heat transfer member 31 can be controlled by tightening torque. Since the axial force of the screw 34 is controlled by tightening torque, the channel 36 for the coolant can be stably and hermetically sealed in the long term.

Sixth Embodiment

Figure 15:
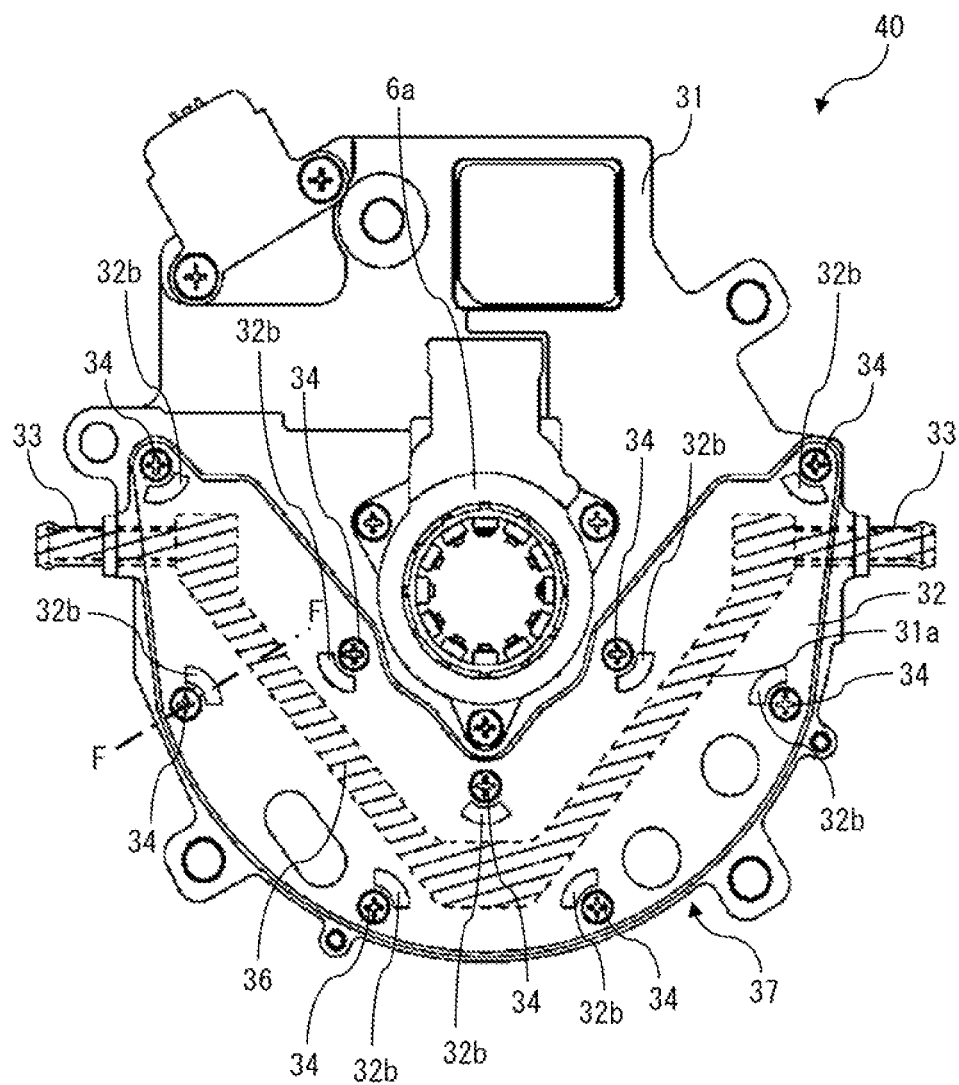
FIG. 15 is a plan view illustrating an inverter unit, on a side of a motor unit, in a rotary electric machine according to the sixth embodiment of the present disclosure.
Figure 16:
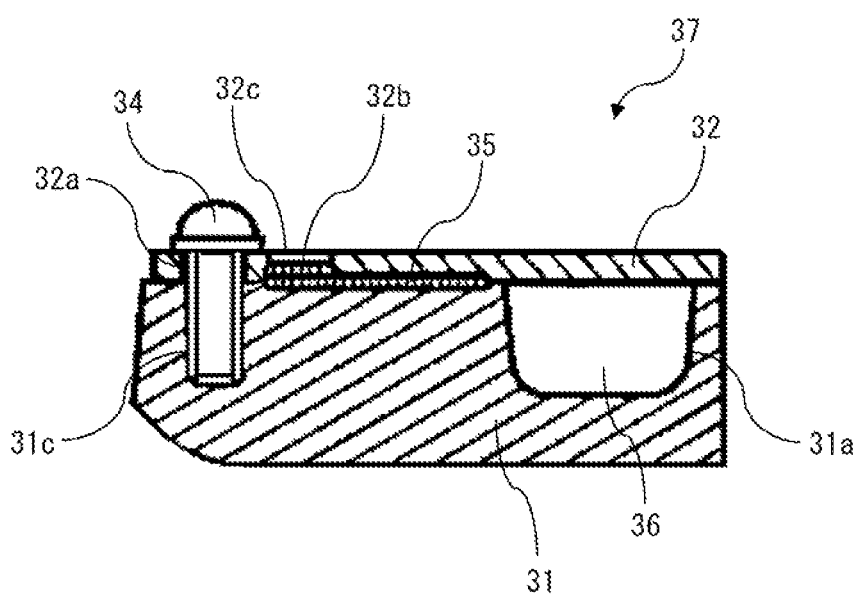
FIG. 16 is a cross-sectional view of a main section of the inverter unit cut at an F-F cross-sectional position in FIG. 15.

Hereinafter, a rotary electric machine 1 according to the sixth embodiment will be described. FIG. 15 is a plan view illustrating the inverter unit 40, on a side of the motor unit 30, in the rotary electric machine 1 according to the sixth embodiment, and FIG. 16 is a cross-sectional view of a main section of the inverter unit 40 cut at an F-F cross-sectional position in FIG. 15. The rotary electric machine 1 according to the sixth embodiment has a configuration wherein the recess 32b provided on the surface of the lid member 32 on the other side and the surface of the lid member 32 on the one side are communicated with each other.

In the present embodiment, as illustrated in FIG. 16, the recess 32b is provided at a position between the through hole 32a and the channel groove 31a on the surface of the lid member 32 on the other side in the axial direction. The recess 32b provided on the surface of the lid member 32 on the other side in the axial direction is communicated with the surface of the lid member 32 on the one side which is opposite to the surface thereof on the other side in the axial direction. In FIG. 16, a communication portion 32c is a portion where the recess 32b and the surface of the lid member 32 on the one side in the axial direction are communicated with each other. In FIG. 16, the recess 32b is entirely communicated with the surface on the one side, but the configuration wherein the recess 32b is communicated with the surface on the one side is not limited thereto. The recess 32b may be partially communicated with the surface on the one side.

As discussed above, in the rotary electric machine 1 according to the sixth embodiment, the recess 32b provided on the surface of the lid member 32 on the other side in the axial direction is communicated with the surface of the lid member 32 on the one side which is opposite to the surface thereof on the other side in the axial direction. Thus, since a portion for receiving the sealing agent 35 in the lid member 32 is enlarged, it is possible to achieve a configuration of further preventing the sealing agent 35 which is pressed and expanded when the lid member 32 is being fixed to the heat transfer member 31, from reaching the screw hole 31c. Besides, since the recess 32b is communicated with the surface of the lid member 32 on the one side in the axial direction, the sealing agent 35 which has entered the recess 32b from the one side of the lid member 32 can be confirmed through visual observation, thereby enabling easy control of the filling amount of the sealing agent 35. Furthermore, since it is easy to control the filling amount of the sealing agent 35, the productivity of the rotary electric machine 1 can be improved.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 rotary electric machine
2 rotor
2a field winding
2b field core
3 stator
3a stator winding
3b stator core
3c stator lead-out wire
4 front bracket
5 rear bracket
5a bolt
6 magnetic pole position detecting sensor
6a sensor stator
6b sensor rotor
7 bearing
8 bearing
9 power module
9a AC terminal
9b ground terminal
9c input terminal
9d control terminal
10 field module
11 rotary shaft
12 pulley
13 slip ring
14 case
14a terminal
14b terminal
15 rear cover
16 brush
16a brush holder
17 control module
18 connecting board
19 terminal
19a connection portion
19b connection portion
19c screw
20 air cooling fan
21 air cooling fan
30 motor unit
31 heat transfer member
31a channel groove
31b recess
31c screw hole
31d groove-side recess
31e side portion
31f communication portion
32 lid member
32a through hole
32b recess
32c communication portion
33 coolant input/output pipe
34 screw
35 sealing agent 35a space
36 channel
37 cooler
40 inverter unit

What is claimed is:

1. A rotary electric machine comprising:
a motor unit provided with a rotary shaft, a rotor having a field core around which a field winding is wound and rotating integrally with the rotary shaft, a stator placed on an outer side of the field core in a radial direction and having a stator core around which a stator winding is wound, and a bracket covering an outer side of the field core and the stator core and holding one end side and another end side of the rotary shaft via a bearing; and
an inverter unit provided with a power module having a switching element for turning on and off current supplied to the stator winding, a field module having a switching element for turning on and off current supplied to the field winding, and a cooler for cooling the power module and the field module, the inverter unit being placed on the other side of the bracket in an axial direction so as to be fixed to the bracket, wherein
the cooler is provided with a heat transfer member having, on a surface thereof on the other side in the axial direction, the power module and the field module thermally connected thereto, and having, on the surface thereof on one side in the axial direction, a channel groove recessed toward the other side in the axial direction, a lid member for closing an opening in the channel groove on the one side in the axial direction, a sealing agent for filling a gap between the heat transfer member and the lid member along the periphery of the channel groove, and a coolant supply/discharge unit for supplying/discharging a coolant to/from a channel surrounded by the channel groove and the lid member,
the lid member is fixed to the heat transfer member with a screw hole provided in the outer circumference of a surface of the heat transfer member on the one side in the axial direction, a through hole provided at a portion of the lid member which faces the screw hole, and a screw screwed into the screw hole through the through hole, and
at a position between the screw hole and the through hole, and the channel groove, a recess is provided on one or both of the surface of the heat transfer member on the one side in the axial direction and the surface of the lid member on the other side in the axial direction, and the sealing agent fills a portion that is closer to the channel groove than the recess, while no sealing agent is applied closer to the screw hole than the recess.

2. The rotary electric machine according to claim 1, wherein a groove-side recess is provided along the periphery of the channel groove on the surface of the heat transfer member on the one side in the axial direction.

3. The rotary electric machine according to claim 2, wherein
the recess is provided on the surface of the heat transfer member on the one side in the axial direction, and
the recess has a depth shallower than a depth of the groove-side recess, and the recess and the groove-side recess are communicated with each other on the surface of the heat transfer member on the one side in the axial direction.

4. The rotary electric machine according to claim 3, wherein the recess provided on the surface of the heat transfer member on the one side in the axial direction is communicated with a side portion of the heat transfer member.

5. The rotary electric machine according to claim 2, wherein the recess provided on the surface of the heat transfer member on the one side in the axial direction is communicated with a side portion of the heat transfer member.

6. The rotary electric machine according to claim 2, wherein the recess provided on the surface of the lid member on the other side in the axial direction is communicated with the surface of the lid member on the one side which is opposite to the surface thereof on the other side in the axial direction.

7. The rotary electric machine according to claim 1, wherein the recess provided on the surface of the heat transfer member on the one side in the axial direction is communicated with a side portion of the heat transfer member.

8. The rotary electric machine according to claim 1, wherein the recess provided on the surface of the lid member on the other side in the axial direction is communicated with the surface of the lid member on the one side which is opposite to the surface thereof on the other side in the axial direction.

* * * * *